Aug. 26, 1924.
A. CATTONI
PIPE COUPLING
Filed May 19, 1923
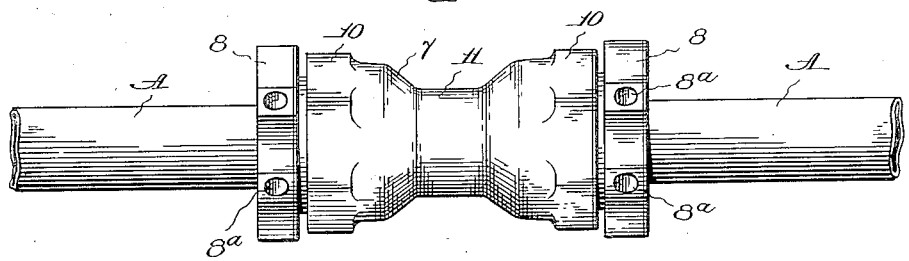
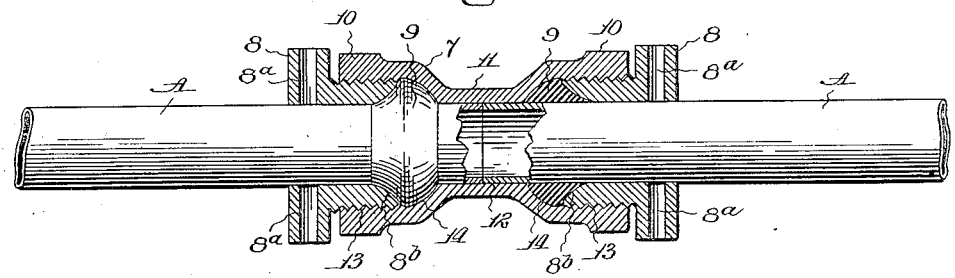
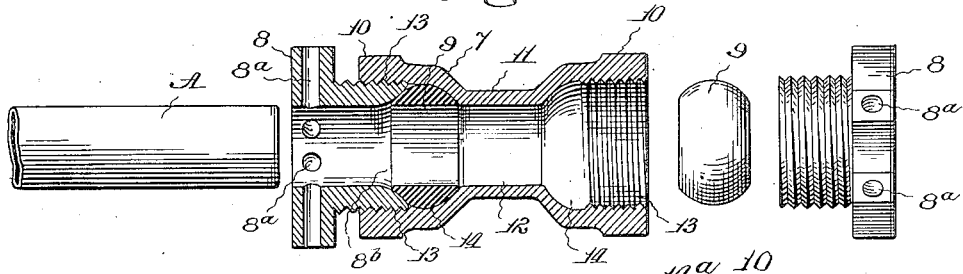
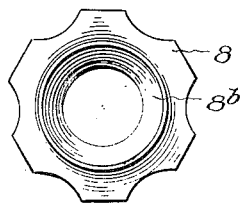
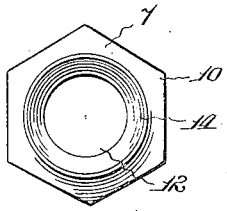
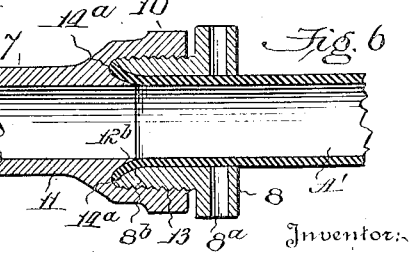
Inventor:
Albino Cattoni.
By John D Thomas & Co
Attorneys.

Patented Aug. 26, 1924.

1,506,564

UNITED STATES PATENT OFFICE.

ALBINO CATTONI, OF BRADFORD, PENNSYLVANIA.

PIPE COUPLING.

Application filed May 19, 1923. Serial No. 640,184.

*To all whom it may concern:*

Be it known that I, ALBINO CATTONI, a citizen of the United States, residing at Bradford, in the county of McKean and State of Pennsylvania, have invented a Pipe Coupling, of which the following is a specification.

My invention is an improvement in pipe couplings of that particular class commonly known as unions, in which two sections of pipe are connected together in such manner as to provide a tight joint that will withstand the pressure of liquid passing through said pipe sections.

The primary object of my invention is to provide a pipe coupling or union of this general type which will facilitate the operation of coupling pipe sections to provide a leak-tight joint, and in the present instance will couple unthreaded ends of pipe sections to thereby obviate the necessity of threading them as required in the use of the conventional form of union; being particularly useful and convenient in connecting pipes, hose and tubes of the water circulating systems of automobile and other internal combustion engines.

A further object of my invention is to couple or connect the plain ends of pipe sections by a coupling in which the particular construction and arrangement of parts cooperate to reinforce the joint and thereby provide a strong connection that is not liable to become loose and leak in such instances where the connected pipes are subjected to vibration.

Other objects and advantages of my invention will hereinafter appear, and what I particularly claim as new and desire to protect by Letters Patent is more specifically set forth in the appended claim.

In the drawings:

Fig. 1 is a side elevation illustrating the application of my improved pipe coupling.

Fig. 2 is a longitudinal sectional view through the pipe coupling showing sections of pipe connected thereby.

Fig. 3 is a detail sectional view of the coupling with the parts at one end separated from the body portion.

Fig. 4 is an end view of one of the compression collars, and

Fig. 5 is a similar view of the body portion of the coupling.

Fig. 6 is a sectional view showing a modification.

As illustrated in the drawings my improved coupling device comprises a substantially cylindrical body portion 7 with an opening therethrough enlarged in diameter at its ends, compression collars or glands 8 threaded into the opposite ends of said body portion to receive the sections of pipe which extend through the same to meet at the center of the body portion, and packing rings 9 interposed between the inner ends of the compression collars and opposing walls within the body portion to be compressed around the pipe; the connected end portions of the pipe sections A fitting snugly within the reduced center portion of the body and in the compression collars to reinforce the connection while the particular construction of the compression collars and interior shape of the body portion cooperate with the packing rings to provide a tight non-leakable joint.

The body portion 7 of the coupling is spool-shape, the enlarged ends 10 tapering to the reduced center portion 11, and said enlarged ends are squared or flattened to receive an ordinary nut-wrench for holding this part of the coupling device during the operation of turning the compression cups 8 into or out of the same, though it will be understood that said enlarged ends may be milled or provided with holes to receive rods for the same purpose. The spool-shape configuration of this body portion corresponds approximately with the shape of the opening extending through the same, for it will be noted that the contracted portion 12 of said opening is at the center 11 and the end portions 13 of larger diameter are within the enlarged ends 10 of said body. In the present instance, also, the intermediate portion of the opening at each end of the body 7, that is that portion, as 14, of said opening between the smaller diameter 12 and larger diameter 13 is concave to receive the packing-ring 9 and cooperate with the inner end of the compression-collar 8 in forming a leak-proof joint. For this purpose the opening through the compression collar for the pipe is at its inner end flared outward convexly.

Female threads are formed in the ends of the body portion 7 and male threads on the compression collars to engage said female threads when the collars are connected to said body portion, and in order that these collars may be readily turned they are flanged at their outer ends with radial holes 8ª to receive rods or pins (not shown) such as usually employed in similar instances. It may be mentioned, also, that the engaging threads at both ends of the coupling are preferably right-hand threads, that is to say both collars are turned to the right—with respect to each end of the coupling—in screwing them into the body portion.

The packing rings 9 may be made of rubber, leather, or other material usually employed for a like purpose, being shaped substantially semi-circular in cross-section with a straight opening therethrough slightly flared at one end, its outer end, to receive the pipe, and the opening in each packing ring corresponds in diameter with the central bore 12 in the body portion 7 and with the openings through the compression collars 8 forming a continuous opening to receive the pipe sections, it being understood of course that the pipe-coupling will be made in different sizes for use in connection with standard sizes of pipe.

In assembling the coupling device for sale to the trade the packing rings 9 are inserted into the opposite ends of the body portion 7 to engage the concavity 14 at the inner end of each enlarged end portion of the opening through said body portion, and then the compression collars 8 are screwed into the opposite ends of the body portion to bear slightly against said packing rings, as shown at the left of Fig. 3 of the drawings. In using the device to couple two pipe sections it is only necessary to insert an end portion of each pipe-section into the coupling at opposite ends thereof, passing said pipe-sections through the compression-collars and packing rings until they meet in the bore at the center of the body portion, and then the compression-collars are turned to compress the packing rings tightly and prevent leakage. When the pipe sections are coupled they are firmly held by the engagement of the packing-rings, and as each section has an extended bearing in the coupling device the joint is not likely to become loose and will therefore hold even when the pipe is subjected to vibration, as for instance when employed in the water cooling system of a motor vehicle. However, it will be obvious that the improved coupling device may be used wherever it is desired to couple two pipes, hose, tubings, and in any instance it is not necessary that the connected ends of the pipe or tubing be threaded.

The device provides a very economical coupling and one that may be readily and conveniently manipulated in making a leak-tight connection, and as the operation of joining pipe or tubing is very simple it may be quickly accomplished even by a person inexperienced in work of this kind.

Although I prefer to make the body portion spool-shape, as hereinbefore stated and for the purposes set forth this is not essential, and likewise the flanged ends of the compression collars may be shaped in a different manner within the scope of my invention and claim.

In Fig. 6 I have shown a modification of the coupling for use with hose or rubber tubing, in which the concavity 14ª in the body portion is extended forward to provide an annular lip 12ᵇ over which the inner end of said flexible hose or tubing is distended or sprung and clamped by screwing the compression collar 8 in place, thus dispensing with the packing ring. However, hose or rubber pipe of the usual thickness and stability may be connected as shown in the preferred form of the coupling in which the packing ring is employed.

I claim:

A pipe coupling comprising a body portion or casing having an opening therethrough the central portion of which corresponds in diameter with the external diameter of the sections of pipe to be coupled and the end portions of said opening being of larger diameter and threaded; the inner annular end wall of each enlarged portion of the opening having a plain concave surface; together with convex packing rings fitting in the enlarged portions of the opening in the body portion or casing and adapted to receive the ends of the pipe sections through them, said packing rings being of resilient material and fitting against the aforesaid concave end walls and flanged compression collars threaded into the ends of the body portion and having plain openings through the same for the pipe sections, said openings being flared outward convexly at their inner ends to cooperate with the aforesaid concave walls in compressing the packing rings to form a tight joint.

ALBINO CATTONI.